US007540504B2

(12) United States Patent
Ehman et al.

(10) Patent No.: US 7,540,504 B2
(45) Date of Patent: Jun. 2, 2009

(54) STEP CLIMBING WHEELCHAIR

(76) Inventors: Mike Ehman, 25 Widez Cres., Weyburn, Sk. (CA) 54H 3L5; Dennis Mainil, Box 1285, Weyburn (CA) 54H 2 L5; Colby Mainil, Box 1285, Weyburn SK (CA) 54H 2L5

( * ) Notice: Subject to any disclaimer, the term of this patent is extended or adjusted under 35 U.S.C. 154(b) by 193 days.

(21) Appl. No.: 11/684,421

(22) Filed: Mar. 9, 2007

(65) Prior Publication Data

US 2008/0073863 A1 Mar. 27, 2008

(30) Foreign Application Priority Data

Sep. 22, 2006 (CA) .................................... 2560637

(51) Int. Cl.
*B62B 5/02* (2006.01)

(52) U.S. Cl. ......................... 280/5.2; 280/5.3; 280/5.32

(58) Field of Classification Search .................. 280/5.2, 280/5.3, 5.32
See application file for complete search history.

(56) References Cited

U.S. PATENT DOCUMENTS 3,573,877 A * 4/1971 Locke ....................... 280/5.32
3,976,152 A * 8/1976 Bell ............................. 180/9
4,119,163 A 10/1978 Ball
4,222,449 A 9/1980 Feliz
4,455,029 A * 6/1984 Taylor ....................... 280/5.28
5,228,709 A * 7/1993 Kao ........................ 280/250.1
6,554,086 B1 * 4/2003 Goertzen et al. ........... 180/65.1

* cited by examiner

*Primary Examiner*—Paul N Dickson
*Assistant Examiner*—Michael R Stabley
(74) *Attorney, Agent, or Firm*—Patterson, Thuente, Skaar & Christensen, P.A.

(57) ABSTRACT

A step climbing wheelchair apparatus includes right and left lift anus, and a longitudinal slot defined in a middle portion of each lift arm. The rear wheel axles of the wheelchair extend through the slot and a fastener is attached to secure each lift aim on the corresponding axle such that each lift arm can slide longitudinally perpendicular to the axle. The lift anus are configured such that when in an extended position rear step ends of the lift arms are located rearward of the outer rim of the rear wheel, and the front ends are located generally forward of the outer rim of the rear wheel. A front lift mechanism provides a lift lever operative to push a lift wheel downward to raise the front caster wheels of the wheelchair.

18 Claims, 3 Drawing Sheets

STEP CLIMBING WHEELCHAIR

RELATED APPLICATION

The present application claims priority to Canadian Application No. 2,560,637 filed Sep. 22, 2006, which is incorporated herein in its entirety by reference.

BACKGROUND

This invention relates to wheelchairs and in particular to a wheelchair adapted for climbing a step, curb, or the like.

Persons using wheelchairs are limited in their ability to travel by curbs, steps, and the like. Where sloped curbs are not provided at street intersections, wheelchair occupants may be able to maneuver down from the sidewalk curb onto the street, but to climb the curb once the street has been crossed is often not possible, forcing the wheelchair to travel down the street in order to find a driveway, alley, or like sloped access to the sidewalk.

Various stair and step climbing wheelchairs have been developed. See for example U.S. Pat. No. 6,554,086 to Goertzen et al., U.S. Pat. No. 4,222,449 to Feliz, and U.S. Pat. No. 4,119,163 to Ball. Also it is known to mount a ramp on a wheelchair for mounting curbs, such as is disclosed in U.S. Pat. No. 3,976,152 to Bell.

SUMMARY OF THE INVENTION

It is an object of the present invention to provide a method of operating a wheelchair and a wheelchair apparatus adapted for climbing steps, curbs, and the like that overcomes problems in the prior art.

The present invention provide, in a first embodiment, a step climbing wheelchair apparatus comprising right and left axles extending out from rotational axes of corresponding right and left rear wheels of a wheelchair, and right and left lift alms, and a longitudinal slot defined in a middle portion of each lift arm, and a handle on a front end of each lift arm. The right and left axles extend through the slots defined by corresponding right and left lift arms, and a fastener is attached to secure each lift arm on the corresponding axle such that each lift arm can slide longitudinally substantially perpendicular to the axle from an extended position, where the axle is located at a front handle end of the slot, to a retracted position where the axle is located at an opposite rear step end of the slot. The lift arms are configured such that when in the extended position rear step ends of the lift arms are located rearward of the outer rim of the rear wheel, and the handles are located generally forward of the outer rim of the rear wheel. A front lift mechanism comprises a lift wheel and a lift lever operative to push the lift wheel downward to raise the front caster wheels of the wheelchair.

The present invention provides, in a second embodiment, a method of climbing a step with a wheelchair, the wheelchair having right and left axles extending out from rotational axes of corresponding right and left rear wheels of the wheelchair. The method comprises providing right and left lift arms with a longitudinal slot defined in a middle portion of each lift arm, and a handle on a front end of each lift arm; attaching the right and left lift arms to corresponding right and left rear wheel axles of the wheelchair by inserting the right and left axles extend through the slots, and attaching a fastener to secure each lift arm on the corresponding axle such that each lift arm can slide longitudinally substantially perpendicular to the axle from an extended position, where the axle is located at a front handle end of the slot, to a retracted position where the axle is located at an opposite rear step end of the slot, and wherein the lift arms are configured such that when in the extended position rear step ends of the lift arms are located rearward of the outer rim of the rear wheel, and the handles are located generally forward of the outer rim of the rear wheel; providing a front lift mechanism comprising a lift wheel located forward of front caster wheels of the wheelchair, and a lift lever operative to push the lift wheel downward to raise the front caster wheels of the wheelchair; occupying the wheelchair and maneuvering the wheelchair in a rearward direction such that the rear wheels are adjacent to the step; moving the lift alms to the extended position such that the rear step ends are rearward of the outer rims of the rear wheels above the step; lifting the handles of the lift arms to move the rear step ends down to bear against a top of the step and moving the handles upward to exert a force upward and rearward on the axles to roll the rear wheels upward and rearward onto the top of the step; exerting a force on the rear wheels to roll the rear wheels rearward to move the wheelchair rearward until front caster wheels of the wheelchair are adjacent to the step; manipulating the lift lever to push the lift wheel downward and raise the front caster wheels; exerting a force on the rear wheels to move the wheelchair rearward until the front caster wheels of the wheelchair are on the top of the step; moving the lift arms and front lift mechanism to a stored position.

The wheelchair is maneuvered in a rearward direction such that the rear wheels are adjacent to the curb and then manipulates the lift arms to raise the rear wheels onto the curb or step, and then rolls the rear wheels back until the front wheels are at the curb, then manipulates the lift lever to raise the front wheels up so the rear wheels can be rolled back until the front wheels are on the curb. The lift arms and front lift mechanism are moved to a stored position, where they do not interfere with conventional operation of the wheelchair, until required again.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
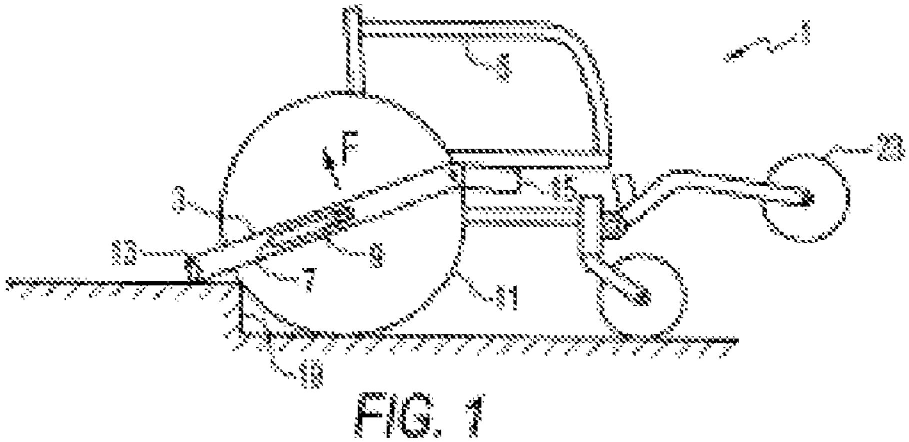
FIG. 1 is a schematic side view of an embodiment of a wheelchair apparatus of the invention in an initial position with the rear wheels against a curb to be climbed.
Figure 2:
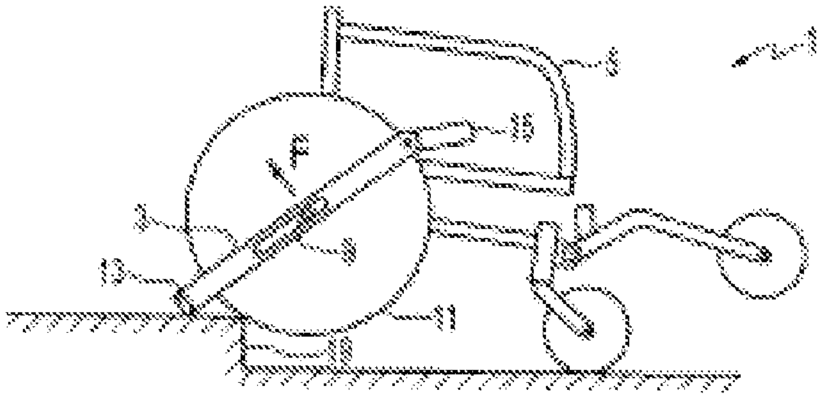
FIG. 2 is a schematic side view of the embodiment of FIG. 1 in an intermediate position with the rear wheels climbing the curb.
Figure 3:
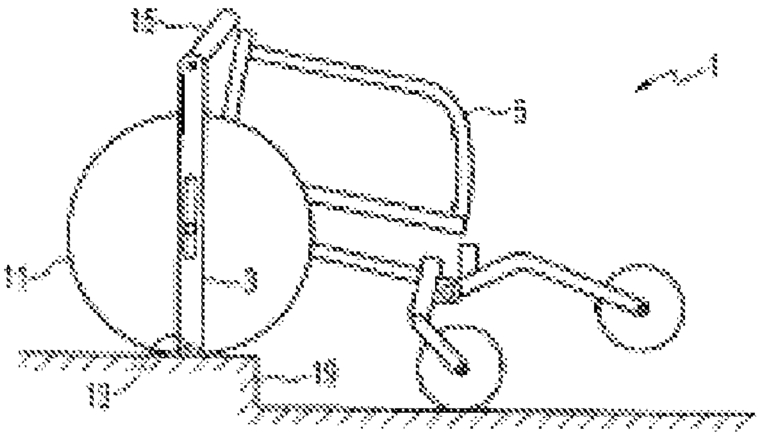
FIG. 3 is a schematic side view of the embodiment of FIG. 1 with the rear wheels on top of the curb.

FIGS. 1-3 schematically illustrate a side view of a step climbing wheelchair apparatus 1 of the present invention moving the rear wheels thereof from a lower street level to a higher curb level. The apparatus 1 comprises a lift arm 3 attached to each side of a conventional wheelchair 5. The lift arms 3 define a longitudinal slot 7 in middle portions thereof and the axle 9 of the large rear wheel 11 of the wheelchair 5 extends through the slot 7 and a fastener (not shown) on the end of the axle 9 secures the lift arm 3 such that same can slide back and forth perpendicular to the axle 9 through the length of the slot 7. The lift arms 3 are configured such that when the axle 9 is located at a front end of the slot 7, as in FIG. 1, the rear step ends 13 of the arms are located rearward of the outer rim of the rear wheel 1 1, and handles 15 at the front ends of the arms 3 are located generally forward of the outer rim of the rear wheel 11.

In operation the wheelchair 5 is maneuvered in a rearward direction such that the rear wheels 11 are adjacent to the step to be climbed, illustrated as a curb 19, as in FIG. 1. The lift arms 3 are moved to locate the axle 9 at the front end of the slot 7 such that the rear step ends 13 of the lift arms 3 are rearward of the outer rims of the rear wheels 11 above the curb 19. The wheelchair occupant then lifts the handles 15 of the lift arms 3 to move the rear step ends 13 down to bear against the ground surface at the top of the curb 19. In the initial position of FIG. 1 the lift arms 3 extend generally at a shallow slope upward from their rear ends 13 to their handles 15 at front ends thereof.

Figure 4:
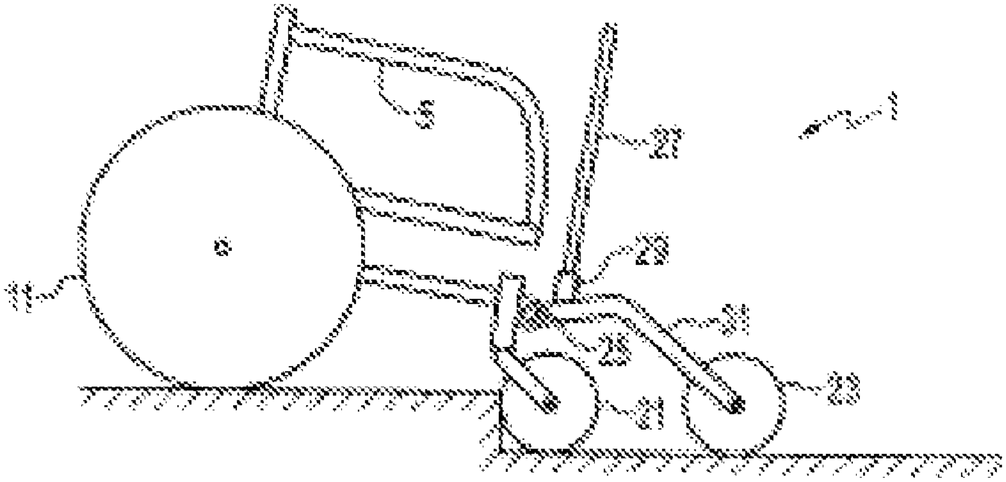
FIG. 4 is a schematic side view of the embodiment of FIG. 1 with the front caster wheels against the curb and the lift wheel lowered onto the ground.

As the occupant moves the handles 15 of the lift arms 3 upward the arms 3 pivot about the axles 9, and exert a force F upward and rearward on the axles 9, and the axles 9 move upward and rearward rolling the rear wheels 11 up through the intermediate position of FIG. 2 onto the top of the curb 19 as shown in FIG. 3. When the position of FIG. 3 has been attained the occupant then exerts a force on the rear wheels to roll the wheels 11 rearward conventionally to move the wheelchair 5 further onto the curb 19 such that the front caster wheels 21 are adjacent to the curb 19 as illustrated in FIG. 4. The arms 3 are not further required, and can be left to drag on the ground until the operation is complete, and then stored as described later.

As seen in the schematic drawings, the lift arms 3 move from a shallow slope upward from their rear ends 13 when first engaging the curb 19 as seen in FIG. 1, toward a more upright orientation as the wheelchair 5 moves rearward to the positions of FIG. 2 and then FIG. 3 and the rear step ends 13 of the lift arms 3 remain stationary on the curb 19. As the arms 3 move upward, the wheels 11 are forced up over the curb 19. The axle 9 slides from the front end of the slot 7 toward the rear end as the arm 3 moves to the more upright orientation, and the wheels 11 generally remain in contact with the curb 9 throughout the operation. Once the rear wheels 11 are on the curb 19 the wheelchair 5 is rolled rearward until the smaller front caster wheels 21 are against the curb 19.

Figure 5:
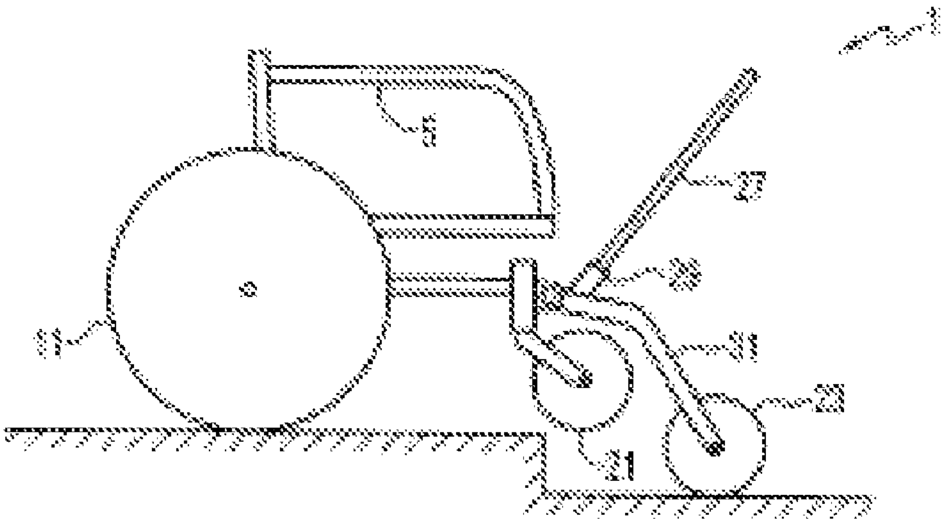
FIG. 5 is a schematic side view of the embodiment of FIG. 1 with the lift wheel pushed downward to raise the front wheels of the wheelchair above the curb so that the wheelchair can be rolled rearward onto the curb.
Figure 6:
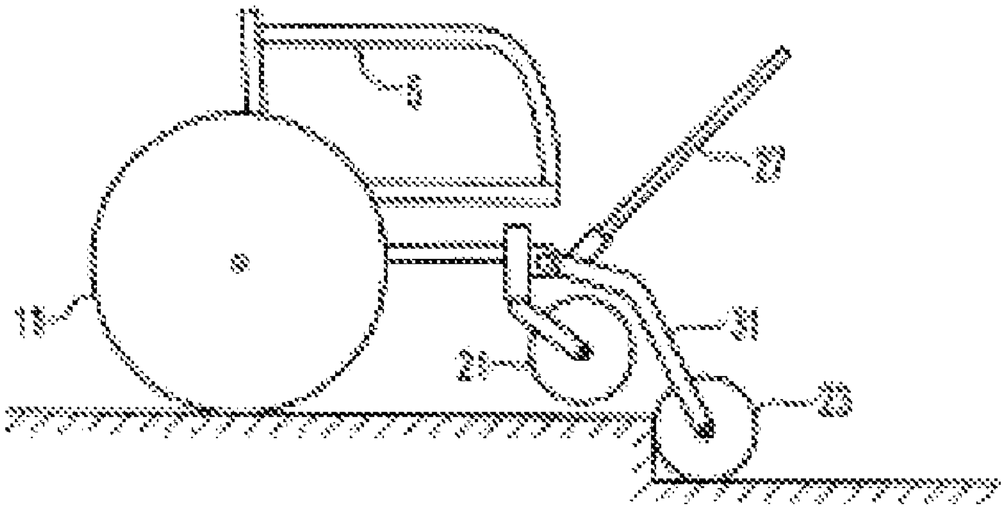
FIG. 6 is a schematic side view of the embodiment of FIG. 1 with the front wheels of the wheelchair on top of the curb.

FIGS. 4-6 schematically illustrate a side view of the modified wheelchair apparatus 1 of the present invention moving the front caster wheels thereof from the lower street level to the higher curb level. A front lift mechanism comprises a lift wheel 23 and a lift lever 27 operative to push the lift wheel 23 downward to raise the front caster wheels 21 of the wheelchair. The front lift wheel 23 is pivotally attached to a front pivot axis 25 at the front of the wheelchair 5 such that the lift wheel 23 is forward of the front wheels 21 of the wheelchair 5. Typically only a single lift wheel 23 is needed, located laterally about mid-way between the two front caster wheels 21.

In FIGS. 1-3 the front lift wheel 23 is shown in a raised storage position where the lift wheel 23 is locked by a pin or the like. The lift wheel 23 may be lowered prior to moving the rear wheels 11 up onto the curb 19 as illustrated in FIGS. 1-3, or after.

In any event when needed the lock is released to allow the lift wheel 23 to move down onto the ground as shown in FIG. 4. A lift lever 27 is inserted into a socket 29 on the lift wheel bar 31 such that the lever 27 extends up between the legs of the occupant. The lift wheel bar 31 is attached at a rear end thereof to a middle front portion of the wheelchair, and extends forward from the wheelchair 5, and the lift wheel 23 is rotatably attached to a forward end of the lift wheel bar 31 such that the lift wheel 23 is forward of the front caster wheels 21. The occupant pushes forward and downward on the lift lever 27 to pivot the lift wheel 23 down and raise the front wheels 21 of the wheelchair 5 up to the position illustrated in FIG. 5 so that the occupant can exert a force on the rear wheels to roll the wheelchair 5 rearward until the front wheels 21 are on the curb 19 as shown in FIG. 6, and the wheelchair 5 is fully on the curb.

Figure 7:
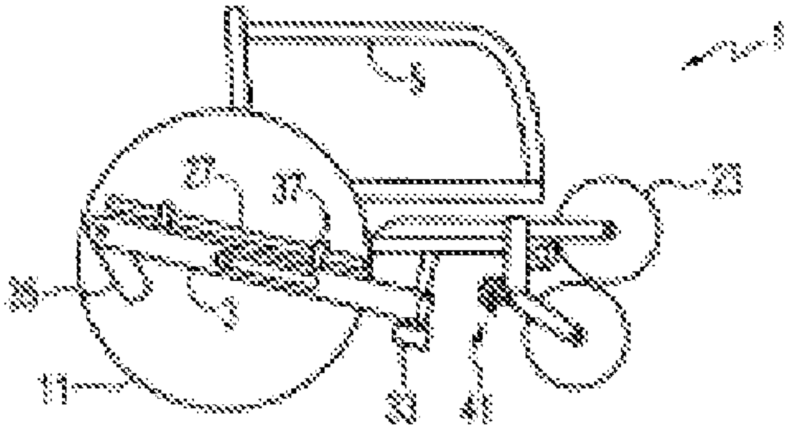
FIG. 7 is a schematic side view of the embodiment of FIG. 1 with the lift wheel, lift arms, and lift lever in storage positions.

FIG. 7 illustrates the apparatus with the lift arms 3, lift lever 27, and front lift wheel 23 stored on the wheelchair 5 such that, when not in use, they do not interfere with conventional operation of the wheelchair 5. The lift wheel bar 31 is configured to slide under the seat of the wheelchair 5, and in the illustrated apparatus 1, a storage bracket 33 is provided to secure the lift arms 3, and the lift lever is secured to clamps 37 on the lift arm 3 on one side of the wheelchair 5. In the illustrated embodiment the lift arm 3 includes a folding extension 35 at the front end 15 that can be folded for more compact storage. Also illustrated in FIG. 7 is a lock mechanism 41 operative to lock the front caster wheels 21 to prevent the front caster wheels 21 from pivoting about their caster axes, thereby providing improved stability when mounting the curb 19.

The apparatus 1 provides a simple mechanism that can be adapted to existing wheelchairs to provide them with the ability to climb a curb or step.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A step climbing wheelchair apparatus comprising:

right and left axles extending out from rotational axes of corresponding right and left rear wheels of a wheelchair;

right and left lift arms, and a longitudinal slot defined in a middle portion of each lift arm, and a handle on a front end of each lift arm;

wherein the right and left axles extend through the slots defined by corresponding right and left lift arms, and a fastener is attached to secure each lift arm on the corresponding axle such that each lift arm can slide longitudinally substantially perpendicular to the axle from an extended position, where the axle is located at a front handle end of the slot, to a retracted position where the axle is located at an opposite rear step end of the slot;

wherein the lift arms are configured such that when in the extended position rear step ends of the lift arms are located rearward of the outer rim of the rear wheel, and the handles are located generally forward of the outer rim of the rear wheel; and a front lift mechanism comprising a lift wheel and a lift lever operative to push the lift wheel downward to raise the front caster wheels of the wheelchair.

2. The apparatus of claim 1 wherein the front lift mechanism comprises a lift wheel bar pivotally attached at a rear end thereof to a middle front portion of the wheelchair, and extending forward from the wheelchair, and wherein the lift wheel is rotatably attached to a forward end of the lift wheel bar such that the lift wheel is forward of the front caster wheels of the wheelchair.

3. The apparatus of claim 2 wherein the lift lever is releasably attachable to the lift wheel bar such that the lift lever extends up between the legs of an occupant of the wheelchair, and wherein the front lift mechanism is configured such that the occupant can push forward and downward on the lift lever to pivot the lift wheel down and raise the front caster wheels of the wheelchair up to a vertical position that is above a step to be climbed.

4. The apparatus of claim 3 wherein the lift wheel bar defines a socket and wherein the lift lever is attached by inserting the lift lever into the socket.

5. The apparatus of claim 1 comprising locks operative to prevent the front caster wheels from pivoting about caster axes thereof.

6. The apparatus of claim 1 wherein the handles are pivotally attached to the front ends of the lift arms such that the handles can be folded to a stored position.

7. The apparatus of claim 1 comprising arm storage brackets attached to each side of the wheelchair configured such that the lift arms can be fastened thereto in a stored position.

8. The apparatus of claim 7 wherein the front lift mechanism is configured such that the lift wheel can be retracted to a stored position in proximity to the wheelchair.

9. The apparatus of claim 8 wherein the lift lever can be removed from the front lift mechanism and secured to a lift arm in a stored position.

10. A method of climbing a step with a wheelchair, the wheelchair having right and left axles extending out from rotational axes of corresponding right and left rear wheels of the wheelchair, the method comprising:

providing right and left lift arms with a longitudinal slot defined in a middle portion of each lift arm, and a handle on a front end of each lift arm;

attaching the right and left lift arm to corresponding right and left rear wheel axles of the wheel chair by inserting the right and left axles extend through the slots, and attaching a fastener to secure each lift arm on the corresponding axle such that each lift arm can slide longitudinally substantially perpendicular to the axle from an extended position, where the axle is located at a front handle end of the slot, to a retracted position where the axle is located at an opposite rear step end of the slot, and wherein the lift arms are configured such that when in the extended position rear step ends of the lift arms are located rearward of the outer rim of the rear wheel, and the handles are located generally forward of the outer rim of the rear wheel;

providing a front lift mechanism comprising a lift wheel located forward of front caster wheels of the wheelchair, and a lift lever operative to push the lift wheel downward to raise the front caster wheels of the wheelchair;

occupying the wheelchair and maneuvering the wheelchair in a rearward direction such that the rear wheels are adjacent to the step;

moving the lift arms to the extended position such that the rear step ends are rearward of the outer rims of the rear wheels above the step;

lifting the handles of the lift arms to move the rear step ends down to bear against a top of the step and moving the handles upward to exert a force upward and rearward on the axles to roll the rear wheels upward and rearward onto the top of the step;

exerting a force on the rear wheels to roll the rear wheels rearward to move the wheelchair rearward until front caster wheels of the wheelchair are adjacent to the step;

manipulating the lift lever to push the lift wheel downward and raise the front caster wheels;

exerting a force on the rear wheels to move the wheelchair rearward until the front caster wheels of the wheelchair are on the top of the step;

moving the lift arms and front lift mechanism to a stored position.

11. The method of claim 10 wherein the front lift mechanism comprises a lift wheel bar pivotally attached at a rear end thereof to a middle front portion of the wheelchair, and extending forward from the wheelchair, and wherein the lift wheel is rotatably attached to a forward end of the lift wheel bar.

12. The method of claim 11 wherein the lift lever is releasably attachable to the lift wheel bar such that the lift lever extends up between the legs of an occupant of the wheelchair, and wherein the front lift mechanism is configured such that the occupant can push forward and downward on the lift lever to pivot the lift wheel down and raise the front caster wheels of the wheelchair up to a vertical position that is above a step to be climbed.

13. The method of claim 12 wherein the lift wheel bar defines a socket and wherein the lift lever is attached by inserting the lift lever into the socket.

14. The method of claim 10 comprising locking the front caster wheels to prevent the front caster wheels from pivoting about caster axes thereof.

15. The method of claim 10 wherein the handles are pivotally attached to the front ends of the lift arms such that the handles can be folded to a stored position.

16. The method of claim 10 comprising arm storage brackets attached to each side of the wheelchair configured such that the lift arms can be fastened thereto in a stored position.

17. The method of claim 16 wherein the front lift mechanism is configured such that the lift wheel can be retracted to a stored position in proximity to the wheelchair.

18. The method of claim 17 wherein the lift lever can be removed from the front lift mechanism and secured to a lift arm in the stored position.

* * * * *